United States Patent
Leung et al.

(10) Patent No.: US 7,599,370 B1
(45) Date of Patent: Oct. 6, 2009

(54) METHODS AND APPARATUS FOR OPTIMIZING NAT TRAVERSAL IN MOBILE IP

(75) Inventors: Kent K. Leung, Mountain View, CA (US); Alpesh Patel, Santa Clara, CA (US); Milind M. Kulkarni, San Jose, CA (US); Madhavi W. Chandra, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 1179 days.

(21) Appl. No.: 10/420,402

(22) Filed: Apr. 17, 2003

Related U.S. Application Data (60) Provisional application No. 60/378,904, filed on May 7, 2002.

(51) Int. Cl.
 *H04L 12/56* (2006.01)
(52) U.S. Cl. .................................. 370/392; 370/395.54
(58) Field of Classification Search .................. 370/229, 370/328, 338, 389, 392, 349, 401, 402, 310.2, 370/331, 395.54; 455/453; 709/245
See application file for complete search history.

(56) References Cited

U.S. PATENT DOCUMENTS

| | | | |
|---|---|---|---|
| 4,692,918 A | 9/1987 | Elliott et al. | |
| 5,016,244 A | 5/1991 | Massey et al. | |
| 5,018,133 A | 5/1991 | Tsukakoshi et al. | |
| 5,218,600 A | 6/1993 | Schenkyr et al. | |
| 5,371,852 A | 12/1994 | Attanasio et al. | |
| 5,473,599 A | 12/1995 | Li et al. | |
| 6,434,627 B1 * | 8/2002 | Millet et al. | 709/245 |
| 6,567,664 B1 * | 5/2003 | Bergenwall et al. | 455/435.1 |
| 6,839,338 B1 * | 1/2005 | Amara et al. | 370/338 |
| 6,856,624 B2 * | 2/2005 | Magret | 370/392 |
| 7,079,520 B2 * | 7/2006 | Feige et al. | 370/338 |
| 7,082,118 B1 * | 7/2006 | Sethi | 370/349 |
| 7,155,235 B2 * | 12/2006 | Veerepalli et al. | 455/453 |
| 7,190,668 B1 * | 3/2007 | Francis et al. | 370/229 |

(Continued)

OTHER PUBLICATIONS

C. Perkins; IP Mobility Support; Oct. 1996; IBM; URL:http://www.ietf.org/rfc/rfc2002.txt.*

(Continued)

*Primary Examiner*—Brenda Pham
(74) *Attorney, Agent, or Firm*—Weaver Austin Villeneuve & Sampson LLP (57) ABSTRACT

Methods and apparatus for optimizing NAT traversal in Mobile IP are disclosed. Various mechanisms may performed independently or in combination with one another. A first mechanism enables one-way keep alive messaging to the Home Agent, while a second mechanism enables two-way keep alive messaging to the Home Agent, thereby enabling an entry in a NAT translation table to be maintained. The two-way keep alive messaging requires that the Home Agent send an acknowledgement message, while the one-way keep alive messaging does not. Keep alive messaging may be performed at the Mobile Node or the Foreign Agent. A third mechanism enables a Foreign Agent to encapsulate a registration request packet with the Foreign Agent care-of address in the source IP address field rather than an egress interface of the Foreign Agent. A fourth mechanism enables a Mobile Node to force a Home Agent to perform UDP tunneling.

42 Claims, 5 Drawing Sheets

U.S. PATENT DOCUMENTS

2001/0036184 A1* 11/2001 Kinoshita et al. ............ 370/389
2003/0123421 A1    7/2003 Feige et al.
2004/0184420 A1*  9/2004 Xu et al. ..................... 370/328
2006/0209778 A1    9/2006 Feige et al.

OTHER PUBLICATIONS

H. Levkowetz, and S. Vaarala; Mobile IP NAT/NAPT Traversal using UDP Tunneling; Mar. 1, 2002; Netseal; URL:http://www1.tools.ietf.org/html/draft-ietf-mobileip-nat-traversal-01.*

S.Vaarala; Mobile NAT/NATP Firewall Traversal; Jul. 12, 2001; Netseal Technologies; URL://www.watersprings.org/pub/id/draft-vaarala-mobileip-nat-traversal-00.txt.*

Examiner's Communication pursuant to Article 96(2) EPC dated Apr. 6, 2005, for European Patent Application No. 02796082.2, Methods and Apparatus for Implementing NAT Traversal in Mobile IP, 6 pages.

Korean Office Action mailed Jan. 30, 2009 from related KR Application No. 2004-7010144, 2 pgs.

Levkowetz, H. et al., "Mobile IP NAT/NAPT Traversal using UDP Tunneling"; ipUnplugged, Nov. 8, 2001, <draft-levkowetz-vaarala-mobileip-nat-traversal-00.txt>, XP-002238804, 24 pgs.

S. Kent and R. Atkinson, "Security Architecture for the Internet Protocol", RFC 2401, Nov. 1998, 50 pgs.

Release notes for 3Com Corporation, "Conducting a Redundant Route for Network Resiliency," Mar. 1994, *NET Builder Family Bridge/Router* pp. 26-29.

Uyless Black, "TCP/IP and Related Protocols," 1992, *McGraw-Hill, Inc.*, pp. 226-249.

T. Li, et al., "Cisco Hot Standby Router Protocol (HSRP)," RFC 2281, Mar. 1998.

C. Perkins, "IP Mobility Support," RFC 2002, IBM Corporation, Oct. 1996.

"Mobile IP," Release 12.0(1)T, pp. 1-55.

Montenegro, G., "Reverse Tunneling for Mobile IP," RFC 2344, Sun Microsystems, Inc., May 1998.

D. Harkins and D. Carrel, "The Internet Key Exchange (IKE)," Internet Draft, Cisco Systems, Jun. 1998.

D. Cong and M. Hamlen, and C. Perkins, "The Definitions of Managed Objects for IP Mobility Support using SMIv2," RFC 2006, Motorola and IBM, Oct. 1996.

Aboba and Beadles, "The Network Access Identifier" RFC 2486, Jan. 1999.

Calhoun and Perkins, "Mobile IP Network Access Identifier Extension, for Ipv4", Internet Draft, Jan. 12, 2000.

S. Deering, "ICMP Router Discovery Message", RFC 1256, Xerox PARC, Sep. 1991, pp. 1-19.

Gleeson et al., "A Framework For IP Based Virtual Private Networks", RFC 2764, Lucent Technologies, Feb. 2000, Copyright © The Internet Society (2000). All rights reserved, pp. 1-62.

Tsirtsis et al., "Network Address Translation—Protocol Translation (NAT-PT)", RFC 2766, Campio Communications, Feb. 2000, Copyright (C) The Internet Society (2000). All Rights Reserved, pp. 1-21.

E. Rosen et al., "BGP/MPLS VPNs", RFC 2547, Cisco Systems, Inc., Mar. 1999, Copyright (C) The Internet Society (1999). All Rights Reserved., pp. 1-25.

Khalil, Mohamed M. et al., "Generalized NAI (GNAI) Extension for Mobile IPv4", Internet Draft, Oct. 2001, 6 pages.

Adrangi, Farid and Prakash, Iyer, "Mobile IPv4 Traversal Across Firewalls", Internet Draft, Nov. 13, 2001, 30 pages.

International Search Report, PCT/US02/41535, completed Apr. 17, 2003, 6 pages.

Vaarala, "Mobile IP NAT/NAPT/Firewall Traversal", Internet Draft, Jul. 12, 2001, 21 pages.

Levkowetz et al., "NAT Traversal for Mobile IP using UDP Tunneling", Internet Draft, Jul. 4, 2001, 15 pages.

Levkowetz et al., "Mobile IP NAT/NAPT Traversal using UDP Tunneling", Internet Draft, Nov. 8, 2001.

Levkowetz and Vaarala, "Mobile IP Traversal of Network Address Translation (NAT) Devices," RFC 3519, Apr. 2003, 34 pages.

C. Perkins, "IP Mobility Support for IPv4," RFC 3220, Jan. 2002, 76 pages.

Second Office Action, with translation dated Dec. 1, 2006 from Chinese Patent Application No. 02802743.4, 7 pgs.

* cited by examiner

METHODS AND APPARATUS FOR OPTIMIZING NAT TRAVERSAL IN MOBILE IP

RELATED APPLICATIONS

This application claims priority from Application Ser. No. 60/378,904, entitled "Mobile IP NAT Traversal," filed on May 7, 2002, by Leung et al, which is incorporated herein by reference for all purposes.

BACKGROUND OF THE INVENTION

1. Field of the Invention

The present invention relates to Mobile IP network technology. More particularly, the present invention relates to optimizing NAT traversal in Mobile IP.

2. Description of the Related Art

Mobile IP is a protocol which allows laptop computers or other mobile computer units (referred to as "Mobile Nodes" herein) to roam between various sub-networks at various locations—while maintaining internet and/or WAN connectivity. Without Mobile IP or related protocol, a Mobile Node would be unable to stay connected while roaming through various sub-networks. This is because the IP address required for any node to communicate over the internet is location specific. Each IP address has a field that specifies the particular sub-network on which the node resides. If a user desires to take a computer which is normally attached to one node and roam with it so that it passes through different sub-networks, it cannot use its home base IP address. As a result, a business person traveling across the country cannot merely roam with his or her computer across geographically disparate network segments or wireless nodes while remaining connected over the internet. This is not an acceptable state-of-affairs in the age of portable computational devices.

To address this problem, the Mobile IP protocol has been developed and implemented. An implementation of Mobile IP is described in RFC 2002 of the Network Working Group, C. Perkins, Ed., October 1996, as well as RFC 3220 of the Network Working Group, C. Perkins, Ed., January 2002. Both of these references are incorporated herein by reference in their entireties and for all purposes. Mobile IP is also described in the text "Mobile IP Unplugged" by J. Solomon, Prentice Hall, which is incorporated herein by reference for all purposes.

Figure 1:
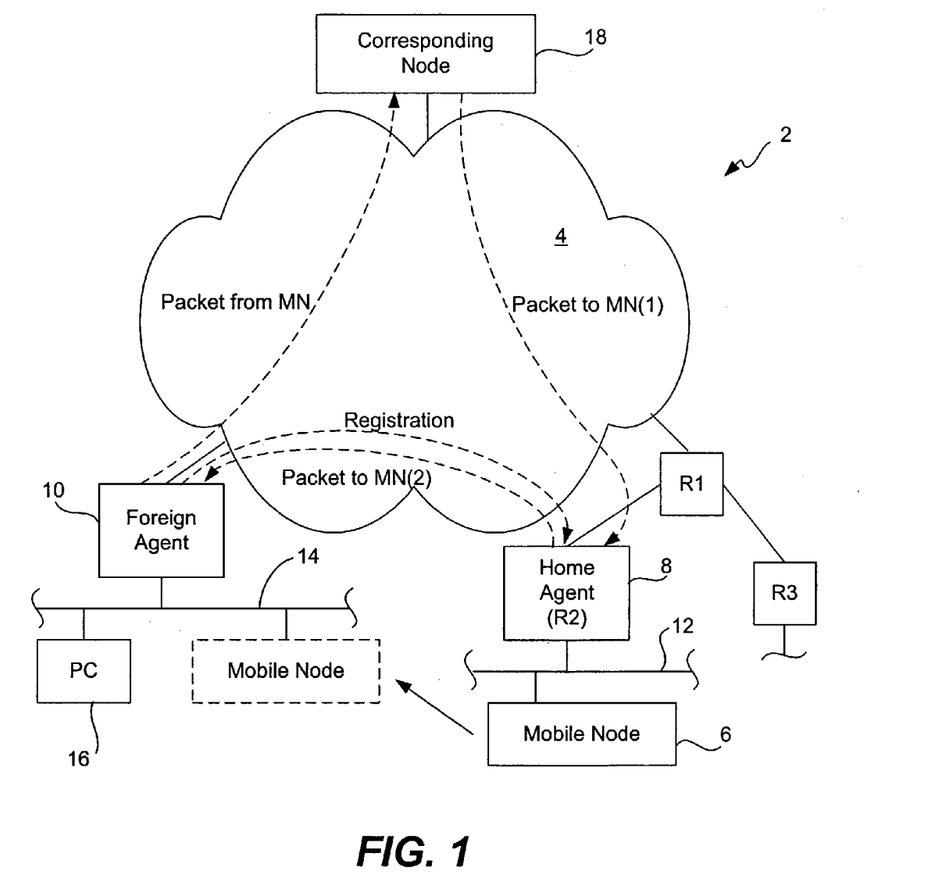
FIG. 1 is a diagram of a Mobile IP network segment and associated environment.

The Mobile IP process and environment are illustrated in FIG. 1. As shown there, a Mobile IP environment 2 includes the internet (or a WAN) 4 over which a Mobile Node 6 can communicate remotely via mediation by a Home Agent 8 and a Foreign Agent 10. Typically, the Home Agent and Foreign Agent are routers or other network connection devices performing appropriate Mobile IP functions as implemented by software, hardware, and/or firmware. A particular Mobile Node (e.g., a laptop computer) plugged into its home network segment connects with the internet through its designated Home Agent. When the Mobile Node roams, it communicates via the internet through an available Foreign Agent. Presumably, there are many Foreign Agents available at geographically disparate locations to allow wide spread internet connection via the Mobile IP protocol. Note that it is also possible for the Mobile Node to register directly with its Home Agent.

As shown in FIG. 1, Mobile Node 6 normally resides on (or is "based at") a network segment 12 which allows its network entities to communicate over the internet 4 through Home Agent 8 (an appropriately configured router denoted R2). Note that Home Agent 8 need not directly connect to the internet. For example, as shown in FIG. 1, it may be connected through another router (a router R1 in this case). Router R1 may, in turn, connect one or more other routers (e.g., a router R3) with the internet.

Now, suppose that Mobile Node 6 is removed from its home base network segment 12 and roams to a remote network segment 14. Network segment 14 may include various other nodes such as a PC 16. The nodes on network segment 14 communicate with the internet through a router which doubles as Foreign Agent 10. Mobile Node 6 may identify Foreign Agent 10 through various agent solicitations and agent advertisements which form part of the Mobile IP protocol. When Mobile Node 6 engages with network segment 14, it composes a registration request for the Home Agent 8 to bind the Mobile Node's current location with its home location. Foreign Agent 10 then relays the registration request to Home Agent 8 (as indicated by the dotted line "Registration"). During the registration process, the Home Agent and the Mobile Node 6 may then negotiate the conditions of the Mobile Node's attachment to Foreign Agent 10. For example, the Mobile Node 6 may request a registration lifetime of 5 hours, but the Home Agent 8 may grant only a 3 hour period. Therefore, the attachment may be limited to a period of time. When the negotiation is successfully completed, Home Agent 8 updates an internal "mobility binding table" which links the Mobile Node's current location via its care-of address (e.g., a collocated care-of address or the Foreign Agent's IP address) to the identity (e.g., home address) of Mobile Node 6. Further, if the Mobile Node 6 registered via a Foreign Agent, the Foreign Agent 10 updates an internal "visitor table" which specifies the Mobile Node address, Home Agent address, etc. In effect, the Mobile Node's home base IP address (associated with segment 12) has been bound to the care-of address such as the Foreign Agent's IP address (associated with segment 14).

Now, suppose that Mobile Node 6 wishes to send a message to a Correspondent Node 18 from its new location. An output message from the Mobile Node is then packetized and forwarded through Foreign Agent 10 over the internet 4 to Correspondent Node 18 (as indicated by the dotted line "packet from MN") according to a standard Internet Protocol. If Correspondent Node 18 wishes to send a message to Mobile Node—whether in reply to a message from the Mobile Node or for any other reason—it addresses that message to the IP address of Mobile Node 6 on sub-network 12. The packets of that message are then forwarded over the internet 4 and to router R1 and ultimately to Home Agent 8 as indicated by the dotted line ("packet to MN(1)"). From its mobility binding table, Home Agent 8 recognizes that Mobile Node 6 is no longer attached to network segment 12. It then encapsulates the packets from Correspondent Node 18 (which are addressed to Mobile Node 6 on network segment 12) according to a Mobile IP protocol and forwards these encapsulated packets to a "care of" address for Mobile Node 6 as shown by the dotted line ("packet to MN(2)"). The care-of address may be, for example, the IP address of Foreign Agent 10. Foreign Agent 10 then strips the encapsulation and forwards the message to Mobile Node 6 on sub-network 14. The packet forwarding mechanism implemented by the Home and Foreign Agents is often referred to as "tunneling."

As indicated above, each mobile node has a designated Home Agent. As specified in RFC 2002, a mobile node is pre-configured with information identifying its Home Agent. In addition, both the mobile node and its Home Agent are also pre-configured with a shared key and Security Parameter Index (SPI) for the shared key, commonly referred to as a security association. Similarly, each Home Agent is pre-configured with information identifying mobile nodes that it supports as well as the corresponding security associations. In this manner, a mobile node is "anchored" to a specific Home Agent to enable it to subsequently register with that Home Agent and receive messages via that Home Agent from Correspondent Nodes.

As described above, when a Mobile Node roams, it typically receives packets sent to it by Correspondent Nodes via a Mobile IP tunnel. Typically, when a Mobile Node registers with its Home Agent, a tunnel is created between the Mobile Node's care-of address (COA) and the Home Agent. However, in order for the Home Agent to reach the COA, the COA must be a public address. Thus, a problem arises when a Mobile Node attempts to register from within a private network.

Mobile operators and service providers assign private IP addresses to their subscribers. More specifically, mobile operators worldwide typically use private Dynamic Host Configuration Protocol (DHCP) or PPP IP Control Protocol (IPCP) address assignment to their mobile users due to the lack of IP addresses. When the users are accessing the internet, the private IP address assigned to a user is translated to a public address at the edge of the private network before the packets are sent via the internet. This function is typically referred to as Network Address Translation (NAT).

When Mobile IP clients attempt to create a Mobile IP session from a private address, the NAT system prevents the Mobile IP session from successfully being established, since the Home Agent will have to terminate its tunnel to the private address, the COA. Typically, a NAT system prevents a Mobile IP session from being established when the COA is a private address, either the Foreign Agent's COA or the Mobile Node's co-located care-of address. Patent application Ser. No. 10/034,302, entitled "Methods and Apparatus for Implementing NAT Traversal in Mobile IP," by Feige G, et al, which is incorporated herein by reference in its entirety, discloses methods and apparatus for establishing a Mobile IP session from a private COA when a NAT system is traversed. While it is possible to establish a Mobile IP session across a NAT system, various existing mechanisms have proved to exhibit various drawbacks and operate in a less efficient manner than desired.

In view of the above, it would be desirable if a Mobile IP session could be successfully and efficiently established from a Mobile Node via a private IP address, as well as maintained in an optimum manner. Moreover, it would be beneficial if such a mechanism could be employed without requiring modifications to the Mobile Node or the encapsulation scheme for both the Mobile Node and the Home Agent.

SUMMARY OF THE INVENTION

Methods and apparatus for optimizing NAT traversal in Mobile IP are disclosed. Various disclosed mechanisms may be performed independently or in combination with one another. In this manner, a Mobile IP session between a Mobile Node that has roamed to a private network may be established with a Home Agent in a public network, as well maintained and optimized.

A first mechanism supports one-way keep alive messaging to the Home Agent, while a second mechanism supports two-way keep alive messaging between the Home Agent and the network device initiating the keep alive messaging. The two-way keep alive messaging requires that the Home Agent send an acknowledgement message, while the one-way keep alive messaging does not. The Home Agent may request one-way keep alive messaging, such as in the registration reply or an extension to the registration reply (e.g., UDP extension to the registration reply). In both the first and second mechanisms, the keep alive message is not a registration request. In this manner, NAT translation table entries are maintained current without requiring extensive processor intensive tasks at the Home Agent.

In accordance with another aspect of the invention, keep alive messaging may be initiated at the Mobile Node or the Foreign Agent. For instance, the Foreign Agent may send a keep alive message on behalf of one or more Mobile Nodes (or nodes) that have roamed to the Foreign Agent. Thus, the keep alive message need not identify the Mobile Node(s), but merely must identify the source IP address of the sender (e.g., Foreign Agent) to enable a NAT translation table entry to be maintained by a NAT module.

In accordance with yet another aspect of the invention, a third mechanism enables a Foreign Agent to encapsulate a registration request packet with the Foreign Agent care-of address in the source IP address field rather than with an egress interface of the Foreign Agent. When NAT traversal has been performed, the care-of address will not be equal to the source IP address. Similarly, when NAT traversal has not been performed, the care-of address will be equal to the source IP address. Thus, when the care-of address is equal to the source IP address, the Home Agent will recognize that NAT traversal has not been performed and vice versa. In this manner, the Home Agent may accurately recognize when NAT traversal has been performed, thereby enabling optimization functions to be performed by the Home Agent.

In accordance with yet another aspect of the invention, a fourth mechanism enables a Mobile Node to force a Home Agent to perform UDP tunneling. For instance, a force bit in a UtDP tunnel extension to a registration request message may be set by the Mobile Node to indicate that UDP tunneling is "requested." The Home Agent may accept or reject this request by performing or failing to perform UDP tunneling. Moreover, the Home Agent may wish to send an acknowledgement indicating whether UDP tunneling is being performed by the Home Agent.

Various network devices may be configured or adapted for performing the disclosed processes (e.g., by a Foreign Agent, Home Agent, Mobile Node, or NAT device). These network devices include, but are not limited to, routers. Moreover, the functionality for the disclosed processes may be implemented in software as well as hardware. Yet another aspect of the invention pertains to computer program products including machine-readable media on which are provided program instructions for implementing the methods and techniques described herein, in whole or in part. Any of the methods of this invention may be represented, in whole or in part, as program instructions that can be provided on such machine-readable media.

These and other features of the present invention will be described in more detail below in the detailed description of the invention and in conjunction with the following figures.

DETAILED DESCRIPTION OF THE PREFERRED EMBODIMENTS

In the following description, numerous specific details are set forth in order to provide a thorough understanding of the present invention. It will be obvious, however, to one skilled in the art, that the present invention may be practiced without some or all of these specific details. In other instances, well known process steps have not been described in detail in order not to unnecessarily obscure the present invention.

Figure 2:
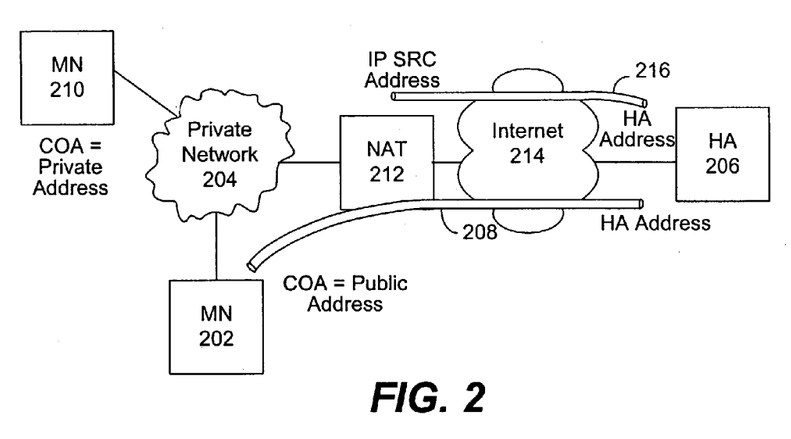
FIG. 2 is a diagram illustrating a system in which NAT traversal is performed in a Mobile IP environment.

FIG. 2 is a block diagram illustrating the problems associated with the receipt of packets by a Mobile Node within a private network from a Home Agent via a public network. As shown, when a Mobile Node 202 roams to a private network 204, it typically registers with its Home Agent 206 via a Foreign Agent (not shown). However, the Mobile Node 202 may register via a collocated care-of address rather than a Foreign Agent. In either case, the care-of address is often a public address. Therefore, a tunnel 208 is typically established between the public care-of address and the Home Agent address.

Unfortunately, as described above, when a Mobile Node roams to a private network 204, private addresses are often assigned due to the lack of IP addresses. Thus, when a Mobile Node 210 obtains a collocated care-of address, the care-of address may be a private address rather than a public address. Moreover, the Foreign Agent care-of address may also be a private address. In this case, when the care-of address is a private address, the IP source address of the registration request will also be a private address. As a result, Network Address Translation (NAT) 212 is performed to translate the IP source address to a public address. Thus, when the registration request is transmitted via the Internet 214, the Home Agent 206 will see a legitimate reachable IP source address so that it may send a registration reply to the IP source address. Unfortunately, the Home Agent will not recognize the private care-of address and therefore will not be able to establish a tunnel between the Home Agent and the private care-of address.

The Home Agent 206 detects when NAT has been performed. When NAT has been performed, a tunnel 216 is established between the IP source address in the registration request and the Home Agent address. In this manner, a Mobile IP session is successfully established by creating a tunnel between the Home Agent and the public source IP address.

When the NAT module changes the private source IP address to a public address so that the packet can be routed, the NAT module uses a translation table to map the private addresses to the public addresses. When a particular private-public address mapping is not used for a period of time, the entry in the translation table is considered to be stale and is then deleted from the translation table.

Various solutions have been proposed to ensure that an entry for a Mobile Node is not deleted while a Mobile Node session is still in force. For instance, by sending a registration request periodically (e.g., every 20 seconds), the NAT module will recognize the private-public address mapping and the associated translation table entry will not be deleted. Unfortunately, due to various processes performed by the Home Agent on a registration request (e.g., MD5 authentication), this solution is a processor intensive one. Moreover, since a single Home Agent typically supports up to 200,000 Mobile Nodes, this solution is not an optimum one.

Figure 3:
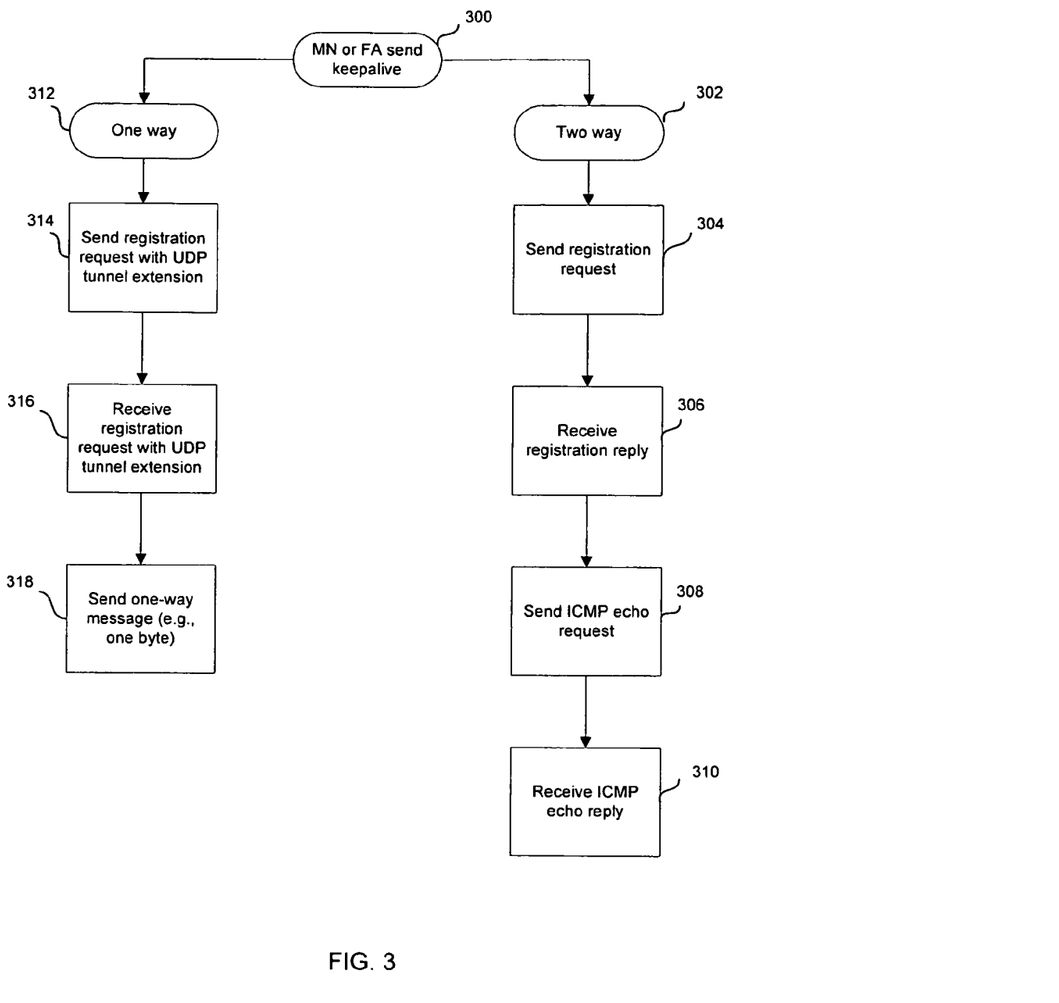
FIG. 3 is a diagram illustrating a method of sending a "keep alive" message in accordance with various embodiments of the invention.

Various other solutions have therefore been proposed in which a message other than a registration request is transmitted periodically to the Home Agent. FIG. 3 is a diagram illustrating a method 300 of sending a "keep alive" message in accordance with various embodiments of the invention. First, a two-way process is illustrated at 302. Specifically, a registration request is sent to the Home Agent at block 304. Upon completion of processing of the registration request by the Home Agent, the Home Agent sends a registration reply at block 306. In order to ensure that the translation table mapping for the private source IP address (e.g., care-of address) is maintained, a keep alive message is sent to the Home Agent at block 308. An acknowledgement message is then sent by the Home Agent at block 310.

As described above, the keep alive message is preferably not a registration request packet (and therefore the acknowledgement message is preferably not a registration reply packet). In accordance with one embodiment, the keep alive message is an Internet Control Message Protocol (ICMP) echo request packet and the acknowledgement message is an ICMP echo reply packet. Accordingly, the keep alive message requires no processing, or minimal processing, by the Home Agent.

A one-way process is illustrated at 312. In other words, an acknowledgement message is not required. First, a registration request is sent at block 314, and a registration reply is returned at block 316. A one-way keep alive message is then sent at block 318 to the Home Agent. The message will then be dropped by the Home Agent. In accordance with one embodiment, the Home Agent requests one-way messaging. Specifically, the registration request includes a UDP tunnel request extension and the registration reply includes a UDP tunnel reply extension including a bit that indicates that the Home Agent is requesting a one-way message that will be dropped by the Home Agent. The one-way message may be an ICMP echo request packet. As another example, the message may include a payload having one byte, thereby minimizing the processing required by the Home Agent.

A keep alive message may be sent by the Mobile Node (e.g., when registration is performed via a collocated care-of address) as well as by a Foreign Agent. Thus, the IP source address of the registration request and additional keep alive message(s) may be an IP address of the Mobile Node or the Foreign Agent. Specifically, when a Foreign Agent has performed proxy registration on behalf of the Mobile Node or node that is not Mobile IP enabled, the address that will be mapped in the NAT translation table will be the Foreign Agent care-of address rather than the Mobile Node IP address. Thus, the Foreign Agent may send a single keep alive message on behalf of one or more visiting Mobile Nodes, rather than requiring each Mobile Node to send a separate keep alive message. For instance, the Foreign Agent may compose a message on behalf of one or more Mobile Nodes visiting the Foreign Agent. Thus, the message (and acknowledgement message) need not identify the Mobile Node(s) visiting the Foreign Agent. Accordingly, by initiating keep alive messages at the Foreign Agent, the Mobile Node may go dormant, saving battery life and bandwidth.

In accordance with one embodiment, if the Foreign Agent sends the keep alive message, it is sent via the tunnel set up by the Mobile Node(s). The source address of the keep alive message corresponds to that of any of the Mobile Nodes that are visiting from the Home Agent where the tunnel terminates. After tunnel encapsulation, the source address of the keep alive message corresponds to the care-of address. Another option is for the Foreign Agent to send a keep alive message directly to the Home Agent by using the care-of-address as the source address (and not send it via the tunnel). The intention is to force the NAT device to keep the NAT entry alive.

Figure 4:
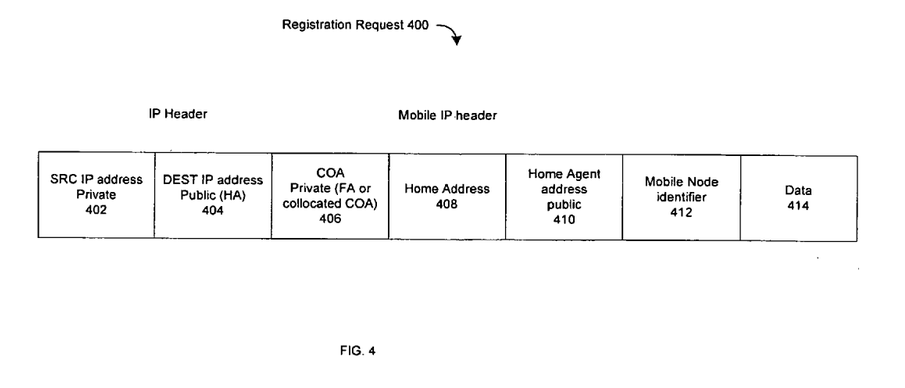
FIG. 4 is a diagram illustrating a registration request packet sent in accordance with various embodiments of the invention.

As described above, a tunnel is generally established between the source IP address of the registration request packet and the Home Agent. FIG. 4 is a diagram illustrating a registration request packet transmitted by the Mobile Node or the Foreign Agent in accordance with various embodiments of the invention. As shown, a registration request packet 400 typically includes an IP source address 402 and an IP destination address 404. In addition, a care-of address 406, Home Address 408, Home Agent address 410, Mobile Node identifier 412 (e.g., IP address), and data 414 are also generally provided in the registration request packet.

Typically, the egress interface of the Foreign Agent is used as the source IP address of the Foreign Agent. However, this is problematic when a NAT module is used in a Mobile IP system. Specifically, in order for a Home Agent to ascertain when a packet has traveled through a NAT module, it compares the care-of address with the source IP address as identified in the registration request packet. If the two addresses are not equal, the Home Agent determines that the registration request has traveled through a NAT module. Unfortunately, when the egress interface is used as the source IP address, the care-of address and the source IP address will not be equal. As a result, the Home Agent will incorrectly conclude that the registration request traversed a NAT module. Thus, in accordance with various embodiments of the invention, the Foreign Agent care-of address (rather than the egress interface address) is transmitted in the source IP address field of the registration request packet.

In accordance with another aspect of the invention, the Mobile Node may force the Home Agent to perform UDP tunneling. Alternatively, the Mobile Node may request that the Home Agent perform UDP tunneling. For instance, the registration request may include a UDP tunnel request extension in which a force bit is set to force the Home Agent to perform UDP tunneling. The Home Agent may indicate whether the Home Agent rejects or accepts this request to perform UDP tunneling. Thus, the Home Agent may or may not perform UDP tunneling in response to the force bit.

The present invention enables a Mobile IP session to be established between a Mobile Node that has roamed to a private network and its Home Agent. More particularly, the Mobile IP session may be established even though the care-of address is a private address rather than a public address. Once the Mobile IP session has been established, the present invention enables the session to be maintained and optimized. In this manner, the Mobile IP session may be established and maintained without requiring modifications to the Mobile Node.

OTHER EMBODIMENTS

Generally, the techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid implementation of the techniques of this invention may be implemented on a general-purpose programmable machine selectively activated or reconfigured by a computer program stored in memory. Such a programmable machine may be a network device designed to handle network traffic, such as, for example, a router or a switch. Such network devices may have multiple network interfaces including frame relay and ISDN interfaces, for example. Specific examples of such network devices include routers and switches. For example, the Home Agents of this invention may be implemented in specially configured routers or servers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the techniques of this invention may be implemented on a general-purpose network host machine such as a personal computer or workstation. Further, the invention may be at least partially implemented on a card (e.g., an interface card) for a network device or a general-purpose computing device.

Figure 5:
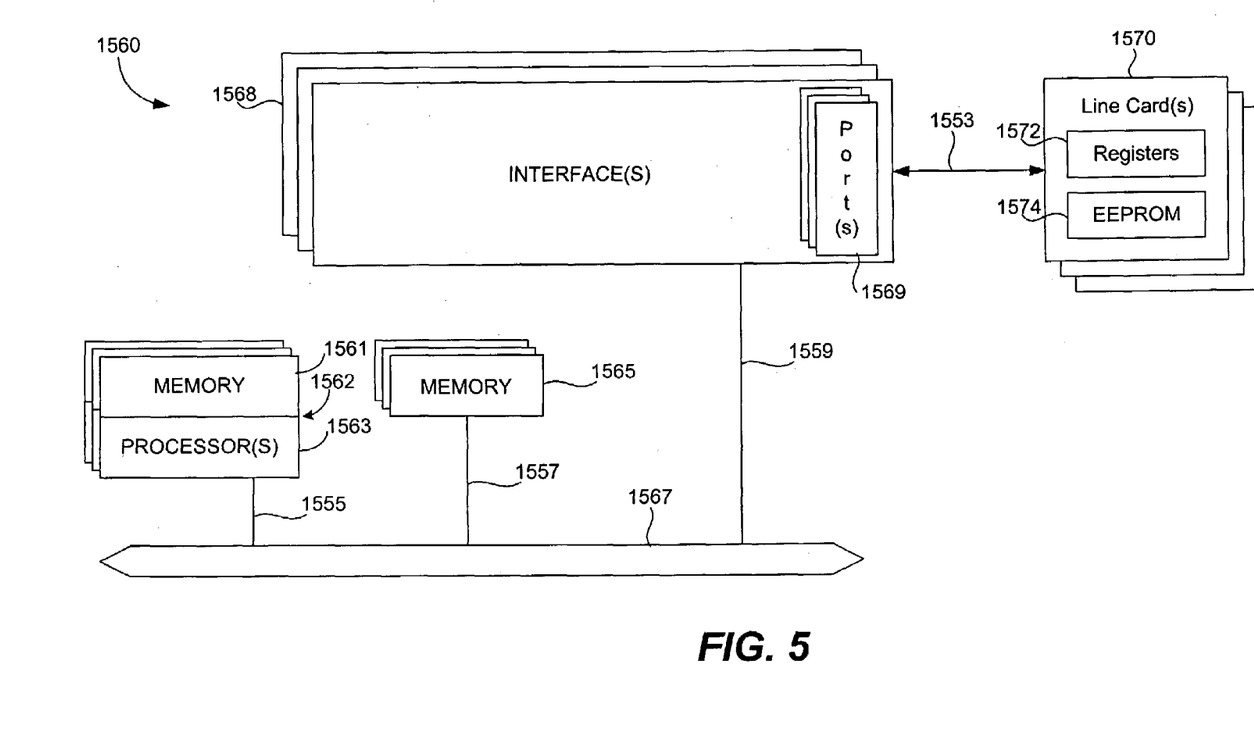
FIG. 5 is a diagram illustrating an exemplary network device in which embodiments of the invention may be implemented.

Referring now to FIG. 5, a network device 1560 suitable for implementing the techniques of the present invention includes a master central processing unit (CPU) 1562, interfaces 1568, and a bus 1567 (e.g., a PCI bus). When acting under the control of appropriate software or firmware, the CPU 1562 may be responsible for implementing specific functions associated with the functions of a desired network device. For example, when configured as an intermediate router, the CPU 1562 may be responsible for analyzing packets, encapsulating packets, and forwarding packets for transmission to a set-top box. The CPU 1562 preferably accomplishes all these functions under the control of software including an operating system (e.g. Windows NT), and any appropriate applications software.

CPU 1562 may include one or more processors 1563 such as a processor from the Motorola family of microprocessors or the MIPS family of microprocessors. In an alternative embodiment, processor 1563 is specially designed hardware for controlling the operations of network device 1560. In a specific embodiment, a memory 1561 (such as non-volatile RAM and/or ROM) also forms part of CPU 1562. However, there are many different ways in which memory could be coupled to the system. Memory block 1561 may be used for a variety of purposes such as, for example, caching and/or storing data, programming instructions, etc.

The interfaces 1568 are typically provided as interface cards (sometimes referred to as "line cards"). Generally, they control the sending and receiving of data packets over the network and sometimes support other peripherals used with the network device 1560. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces, ASI interfaces, DHEI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1562 to efficiently perform routing computations, network diagnostics, security functions, etc.

Although the system shown in FIG. 5 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, memory block 1565) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

While the network device may be used to implement a NAT device, and therefore support NAT functionality, the network device may also be used to implement a Home Agent, Foreign Agent, and/or Mobile Node. Accordingly, the network device may include Mobile IP software and/or hardware to perform standard Mobile IP processes such as registration and de-registration, as well as the above-described processes.

Although illustrative embodiments and applications of this invention are shown and described herein, many variations and modifications are possible which remain within the concept, scope, and spirit of the invention, and these variations would become clear to those of ordinary skill in the art after perusal of this application. However, it should be understood that the invention is not limited to such implementations, but instead would equally apply regardless of the context and system in which it is implemented. Thus, broadly speaking, the operations described above may be used with respect to other mobility agents, such as Foreign Agents. In addition, the above-described invention may be stored on a disk drive, a hard drive, a floppy disk, a server computer, or a remotely networked computer. Accordingly, the present embodiments are to be considered as illustrative and not restrictive, and the invention is not to be limited to the details given herein, but may be modified within the scope and equivalents of the appended claims.

What is claimed is:

1. In a network device supporting Mobile IP, a method of sending a message to a Home Agent enabling a NAT device to maintain an entry in a Network Address Translation table for a source IP address identified in the message, the method comprising:

composing a registration request message identifying a Mobile Node;

sending the registration request message to the Home Agent across a NAT device performing Network Address Translation;

receiving a registration reply message from the Home Agent across the NAT device performing Network Address Translation; and sending a message to the Home Agent after sending the registration request message, wherein the message is addressed to the Home Agent, wherein the message is not a registration request message, wherein the message is sent in order to enable the NAT device to maintain an entry in its Network Address Translation table for the source IP address identified in the message, wherein the source IP address is a private IP address.

2. The method as recited in claim 1, wherein the network device is the Mobile Node.

3. The method as recited in claim 1, wherein the network device is a Foreign Agent.

4. The method as recited in claim 3, wherein the message is composed by the Foreign Agent on behalf of one or more Mobile Nodes.

5. The method as recited in claim 4, wherein the message does not identify the one or more Mobile Nodes.

6. The method as recited in claim 4, wherein the Foreign Agent transmits the message via a tunnel that is created between the Foreign Agent and the Home Agent.

7. The method as recited in claim 6, wherein the source IP address of the message is a Home Address or collocated care-of address of one of the Mobile Nodes.

8. The method as recited in claim 4, wherein the Foreign Agent transmits the message directly to the Home Agent and the source IP address of the message is a care-of address associated with the Foreign Agent.

9. The method as recited in claim 1, further comprising:

receiving an acknowledgement message from the Home Agent, wherein the acknowledgement message is not a registration reply message.

10. The method as recited in claim 9, wherein the device is a Foreign Agent, and wherein the acknowledgement message does not identify the Mobile Node.

11. The method as recited in claim 10, wherein the message does not identify the Mobile Node.

12. The method as recited in claim 9, wherein the message is an ICMP echo request packet and the acknowledgement message is an ICMP echo reply message.

13. The method as recited in claim 1, wherein the message is not processed by the Home Agent and wherein the message is not a data packet.

14. The method as recited in claim 1, wherein the registration request includes a UDP-tunnel request extension and the registration reply includes a UDP-tunnel reply extension, wherein the UDP-tunnel reply extension includes a bit that indicates that the Home Agent is requesting that the message that is transmitted be a one-way message, thereby indicating that the Home Agent will not send a reply to the message.

15. The method as recited in claim 14, wherein the message is an ICMP echo request packet.

16. The method as recited in claim 1, wherein the message includes a payload having one byte.

17. The method as recited in claim 16, wherein the IP header of the message includes a source IP address, the source IP address being an IP address of the Mobile Node or a Foreign Agent to which the Mobile Node has roamed.

18. The method as recited in claim 1, wherein the Home Agent is in a public network.

19. The method as recited in claim 1, wherein the Mobile Node has roamed to a private network.

20. The method as recited in claim 1, wherein the Mobile Node has roamed to a Foreign Agent in a private network.

21. The method as recited in claim 1, wherein the message is not a Mobile IP message.

22. The method as recited in claim 1, wherein the message is sent independent of a lifetime of a registration of the Mobile Node with the Home Agent.

23. In a Home Agent, a method of processing a registration request, comprising:
   receiving a registration request from a network device supporting Mobile IP, the registration request identifying a Mobile Node;
   sending a registration reply across a NAT device performing Network Address Translation to the network device supporting Mobile IP, the registration reply identifying the Mobile Node;
   receiving a keep alive message addressed to the Home Agent from the network device supporting Mobile IP across the NAT device performing Network Address Translation, wherein the keep alive message is not a registration request message; and
   dropping the keep alive message without sending a reply to the network device supporting Mobile IP in response to receiving the keep alive message, wherein the message is sent in order to enable the NAT device to maintain an entry in its Network Address Translation table for a source IP address identified in the keep alive message, wherein the source IP address is a private IP address.

24. The method as recited in claim 23, wherein the keep alive message does not identify the Mobile Node.

25. The method as recited in claim 23, wherein the network device is the Mobile Node such that the keep alive message is received from the Mobile Node.

26. The method as recited in claim 23, wherein the keep alive message includes a payload having one byte.

27. The method as recited in claim 23, wherein the registration request includes a UDP-tunnel request extension and the registration reply includes a UDP-tunnel reply extension, wherein the UDP-tunnel reply extension includes a bit that indicates that the Home Agent is requesting that the keep alive message that is transmitted be a one-way message, thereby indicating that the Home Agent will not send a reply in response to the keep alive message.

28. The method as recited in claim 27, wherein the keep alive message includes a payload having one byte.

29. The method as recited in claim 27, wherein the keep alive message does not identify the Mobile Node.

30. The method as recited in claim 23, wherein the registration request includes a UDP tunnel request extension in which a force bit is set to force the Home Agent to perform UDP tunneling.

31. The method as recited in claim 30, wherein the registration reply indicates whether the Home Agent rejects or accepts UDP tunneling.

32. The method as recited in claim 30, wherein the Home Agent does not perform UDP tunneling in response to the force bit.

33. The method as recited in claim 30, wherein the Home Agent performs UDP tunneling in response to the force bit.

34. In a Home Agent, a method of processing a registration request, comprising:
   receiving a registration request from a network device across a NAT device performing Network Address Translation, the registration request identifying a Mobile Node;
   sending a registration reply to the network device across the NAT device performing Network Address Translation, the registration reply identifying the Mobile Node; and
   receiving a keep alive message addressed to the Home Agent from the network device, wherein the keep alive message is not a registration request message, wherein the keep alive message is sent in order to enable the NAT device to maintain an entry in its Network Address Translation table for a source IP address identified in the keep alive message, wherein the source IP address is a private IP address.

35. The method as recited in claim 34, wherein the keep alive message does not identify the Mobile Node.

36. The method as recited in claim 35, wherein the network device is a Foreign Agent such that the keep alive message is received from the Foreign Agent.

37. The method as recited in claim 34, further comprising:
   composing an acknowledgement message and sending the acknowledgement message to the network device in response to the received keep alive message.

38. A computer-readable storage medium storing thereon computer executable instructions for causing a network device supporting Mobile IP to send a message to a Home Agent enabling a NAT device to maintain an entry in a Network Address Translation table for a source IP address identified in the message, comprising:
   instructions for composing a registration request message identifying a Mobile Node;
   instructions for sending the registration request message to the Home Agent across a NAT device performing Network Address Translation;
   instructions for receiving a registration reply message from the Home Agent across the NAT device performing Network Address Translation; and
   instructions for sending a keep alive message to the Home Agent after sending the registration request message, wherein the keep alive message is addressed to the Home Agent, wherein the keep alive message is not a registration request message, wherein the message is sent in order to enable the NAT device to maintain an entry in its Network Address Translation table for the source IP address identified in the keep alive message.

39. A network device supporting Mobile IP configured for sending a message to a Home Agent enabling a NAT device to maintain an entry in a Network Address Translation table for a source IP address identified in the message, comprising:
   means for composing a registration request message identifying a Mobile Node;
   means for sending the registration request message to the Home Agent across a NAT device performing Network Address Translation;
   means for receiving a registration reply message from the Home Agent across the NAT device performing Network Address Translation; and
   means for sending a keep alive message to the Home Agent after sending the registration request message, wherein the keep alive message is addressed to the Home Agent, wherein the keep alive message is not a registration request message, wherein the message is sent in order to enable the NAT device to maintain an entry in its Network Address Translation table for the source IP address identified in the keep alive message.

40. A network device supporting Mobile IP configured for sending a message to a Home Agent enabling a NAT device to maintain an entry in a Network Address Translation table for a source IP address identified in the message, comprising:
   a processor; and
   a memory, at least one of the processor and the memory being configured for:
      composing a registration request message identifying a Mobile Node;
      sending the registration request message to the Home Agent across a NAT device performing Network Address Translation;
      receiving a registration reply message from the Home Agent across the NAT device performing Network Address Translation; and
      sending a keep alive message to the Home Agent after sending the registration request message, wherein the keep alive message is addressed to the Home Agent, wherein the keep alive message is not a registration request message, wherein the message is sent in order to enable the NAT device to maintain an entry in its Network Address Translation table for the source IP address identified in the keep alive message.

41. A Home Agent, comprising:
   a processor; and
   a memory, at least one of the processor or the memory being configured for:
   receiving a registration request from a network device supporting Mobile IP, the registration request identifying a Mobile Node;
   sending a registration reply across a NAT device performing Network Address Translation to the network device supporting Mobile IP, the registration reply identifying the Mobile Node;
   receiving a keep alive message addressed to the Home Agent from the network device supporting Mobile IP across the NAT device performing Network Address Translation, wherein the keep alive message is not a registration request message; and
   dropping the keep alive message without sending a reply to the network device supporting Mobile IP in response to receiving the keep alive message, wherein the message is sent in order to enable the NAT device to maintain an entry in its Network Address Translation table for a source IP address identified in the keep alive message, wherein the source IP address is a private IP address.

42. A Home Agent, comprising:
   a processor; and
   a memory, at least one of the processor or the memory being configured for:
   receiving a registration request from a network device across a NAT device performing Network Address Translation, the registration request identifying a Mobile Node;
   sending a registration reply to the network device across the NAT device performing Network Address Translation, the registration reply identifying the Mobile Node; and
   receiving a keep alive message addressed to the Home Agent from the network device, wherein the keep alive message is not a registration request message, wherein the keep alive message is sent in order to enable the NAT device to maintain an entry in its Network Address Translation table for a source IP address identified in the keep alive message, wherein the source IP address is a private IP address.

* * * * *

UNITED STATES PATENT AND TRADEMARK OFFICE
CERTIFICATE OF CORRECTION

PATENT NO.      : 7,599,370 B1                                  Page 1 of 1
APPLICATION NO. : 10/420402
DATED           : October 6, 2009
INVENTOR(S)     : Leung et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1484 days.

Signed and Sealed this

Twenty-eighth Day of September, 2010

David J. Kappos
*Director of the United States Patent and Trademark Office*